United States Patent
Wu et al.

(10) Patent No.: US 12,118,169 B2
(45) Date of Patent: Oct. 15, 2024

(54) TOUCH SUBSTRATE AND TOUCH DEVICE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Zhongshan Wu, Beijing (CN); Xiaoyuan Wang, Beijing (CN); Yan Liu, Beijing (CN); Ruiqi Pan, Beijing (CN); Xiaofeng Yin, Beijing (CN); Jiantao Liu, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 6 days.

(21) Appl. No.: 17/788,553

(22) PCT Filed: Aug. 5, 2021

(86) PCT No.: PCT/CN2021/110790
§ 371 (c)(1),
(2) Date: Jun. 23, 2022

(87) PCT Pub. No.: WO2022/048386
PCT Pub. Date: Mar. 10, 2022

(65) Prior Publication Data
US 2023/0333695 A1  Oct. 19, 2023

(30) Foreign Application Priority Data

Sep. 7, 2020 (CN) .......................... 202010930382.3

(51) Int. Cl.
*G06F 3/044* (2006.01)
*G06F 3/041* (2006.01)

(52) U.S. Cl.
CPC .......... *G06F 3/0446* (2019.05); *G06F 3/0416* (2013.01)

(58) Field of Classification Search
CPC ....... G06F 3/044; G06F 3/0446; G06F 3/0416
See application file for complete search history.

(56) References Cited

U.S. PATENT DOCUMENTS

| 2011/0012845 A1 | 1/2011 | Rothkopf et al. |
| 2013/0088459 A1* | 4/2013 | Yeh ........................ G06F 3/0448 345/174 |

(Continued)

FOREIGN PATENT DOCUMENTS

| CN | 103941912 A | 7/2014 |
| CN | 104216582 A | 12/2014 |

(Continued)

*Primary Examiner* — Lixi C Simpson
(74) *Attorney, Agent, or Firm* — Dave Law Group LLC; Raj S. Dave

(57) ABSTRACT

The present invention relates to a touch substrate with a touch control unit including a first touch electrode having a first bus bar extending along a first direction and a first inner electrode extending from the first bus bar, and a second touch electrode having a second bus bar extending along the first direction and a second inner electrode extending from the second bus bar. The first and second bus bars are disposed opposite to each other, the first and second inner electrodes are between the first and second bus bars, alternately and spaced apart from each other in the first direction. Each pair of adjacent first and second inner electrodes constitutes an inner electrode group, within which, at least a portion of the first inner electrode extends toward the second inner electrode, and at least a portion of the second inner electrode extends toward the first inner electrode.

14 Claims, 5 Drawing Sheets

(56) References Cited

U.S. PATENT DOCUMENTS

| | | | |
|---|---|---|---|
| 2014/0192027 A1* | 7/2014 | Ksondzyk | G06F 3/0418 |
| | | | 345/178 |
| 2014/0354301 A1 | 12/2014 | Trend | |
| 2015/0277639 A1 | 10/2015 | Li | |
| 2016/0170524 A1* | 6/2016 | Kim | G06F 3/0446 |
| | | | 345/174 |
| 2017/0068354 A1 | 3/2017 | Meng et al. | |
| 2017/0083152 A1* | 3/2017 | Gourevitch | G06F 3/04186 |
| 2017/0371471 A1 | 12/2017 | Kim et al. | |
| 2020/0285347 A1* | 9/2020 | Ma | G06F 3/0446 |
| 2021/0181898 A1 | 6/2021 | Chen | |

FOREIGN PATENT DOCUMENTS

| | | |
|---|---|---|
| CN | 205028263 U | 2/2016 |
| CN | 105426005 A | 3/2016 |
| CN | 106843571 A | 6/2017 |
| CN | 107562238 A | 1/2018 |
| CN | 107562243 A | 1/2018 |
| CN | 109240543 A | 1/2019 |
| CN | 109656428 A | 4/2019 |
| CN | 110737360 A | 1/2020 |

\* cited by examiner

TOUCH SUBSTRATE AND TOUCH DEVICE

CROSS REFERENCE TO RELATED APPLICATIONS

This patent application is a National Stage Entry of PCT/CN2021/110790 filed on Aug. 5, 2021, which claims the benefit and priority of Chinese patent application no. 202010930382.3, filed on Sep. 7, 2020, and the contents of the above-mentioned Chinese patent application disclosures are incorporated herein as a part of this application.

FIELD

The present disclosure relates to a field of touch technology. More specifically, it relates to a touch substrate and a touch device.

BACKGROUND

Touch products are becoming more and more popular, and their application fields are becoming more and more extensive. Current touch products can be divided into self-capacitive touch products and mutual capacitive touch products in terms of touch principles. However, users' requirements for touch experience are increasing, which introduces further challenges to touch technology.

BRIEF DESCRIPTION

Embodiments of the present disclosure provide a touch substrate. The touch substrate includes a substrate, and at least one touch control unit on the substrate. The touch control unit includes a first touch electrode and a second touch electrode. The first touch electrodes have a first bus bar extending along a first direction and a first inner electrode extending from the first bus bar. The second touch electrode has a second bus bar extending along the first direction and a second inner electrode extending from the second bus bar. Wherein the first bus bar and the second bus bar are opposite to each other, wherein the first inner electrode and the second inner electrode are between the first bus bar and the second bus bar, and the first inner electrode and the second inner electrode are alternately spaced from each other in the first direction. Wherein each pair of adjacent first inner electrode and second inner electrode constitutes an inner electrode group. Within each inner electrode group, at least a portion of the first inner electrode extends toward the second inner electrode, and at least a portion of the second inner electrode extends toward the first inner electrode.

In some embodiments, the touch control unit includes at least two inner electrode groups.

In some embodiments, for each inner electrode group, the first inner electrode includes a first portion connected to the first bus bar and extending toward the second bus bar and a second portion extending toward the second inner electrode, and the second inner electrode includes a first portion connected to the second bus bar and extending toward the first bus bar and a second portion extending toward the first inner electrode.

In some embodiments, a shortest distance from the first portion of the first inner electrode to the first portion of the second inner electrode in a same inner electrode group is greater than a shortest distance between adjacent inner electrode groups.

In some embodiments, the first portion of the first inner electrode and the first portion of the second electrode extend along a second direction perpendicular to the first direction, and the second portion of the first inner electrode and the second portion of the second inner electrode extend along the first direction.

In some embodiments, a second inner electrode of at least one inner electrode group in the touch control unit further includes a third portion extending toward the second portion of the first inner electrode, wherein the third portion of the second inner electrode is between the first portion of the first inner electrode and the first portion of the second inner electrode.

In some embodiments, a second inner electrode of one inner electrode group in the touch control unit further includes the third portion, and wherein the one inner electrode group is at the outermost side of the touch control unit along the first direction.

In some embodiments, for the one inner electrode group, the third portion of the second inner electrode extends along the second direction.

In some embodiments, the second inner electrode of at least one inner electrode group in the touch control unit further includes a fourth portion extending from the first portion of the second inner electrode toward the first portion of the first inner electrode, wherein the fourth portion of the second inner electrode is between the second portion of the second inner electrode and the second portion of the first inner electrode.

In some embodiments, the fourth portion of the second inner electrode extends along a direction opposite to the first direction.

In some embodiments, the first inner electrode of the at least one inner electrode group of the touch control unit further includes a third portion extending from the second portion of the first inner electrode toward the second portion of the second inner electrode, and wherein the third portion of the first inner electrode is between the first portion of the second inner electrode and the third portion of the second inner electrode.

In some embodiments, the third portion of the first inner electrode extends along a direction opposite to the second direction.

In some embodiments, the first inner electrode of the at least one inner electrode group of the touch control unit further includes a fourth portion extending from the first portion of the first inner electrode toward the first portion of the second inner electrode, wherein the fourth portion of the first inner electrode is between the second portion of the first inner electrode and the second portion of the second inner electrode.

In some embodiments, the fourth portion of the first inner electrode extends along the first direction.

In some embodiments, the touch substrate further includes a dummy conductive portion disposed between the first inner electrode and the second inner electrode, wherein gaps are provided between the dummy conductive portion and the first inner electrode and between the dummy conductive portion and the second inner electrode.

In some embodiments, the dummy conductive portion, the first touch electrode and the second touch electrode are hollowed out.

In some embodiments, the first electrode includes a receiving electrode, wherein a range of a width of the first bus bar is 200 µm~400 µm, a range of a width of the first portion of the first inner electrode is 150 µm~350 µm, a range of a width of the second portion of the first inner electrode is 120 μm~300 μm, and a range of a width of the third portion of the first inner electrode is 100 μm~200 μm.

Embodiments of the present invention also provide a touch device. The touch device includes the touch substrate as described above.

BRIEF DESCRIPTION OF THE DRAWINGS

To describe the technical solutions in the embodiments of the present disclosure more clearly, the accompanying drawings of the embodiments are briefly described below. It should be understood that the drawings described below refer only to some embodiments of the present disclosure, and not to restrict the present disclosure, wherein.

DETAILED DESCRIPTION

Figure 1A:
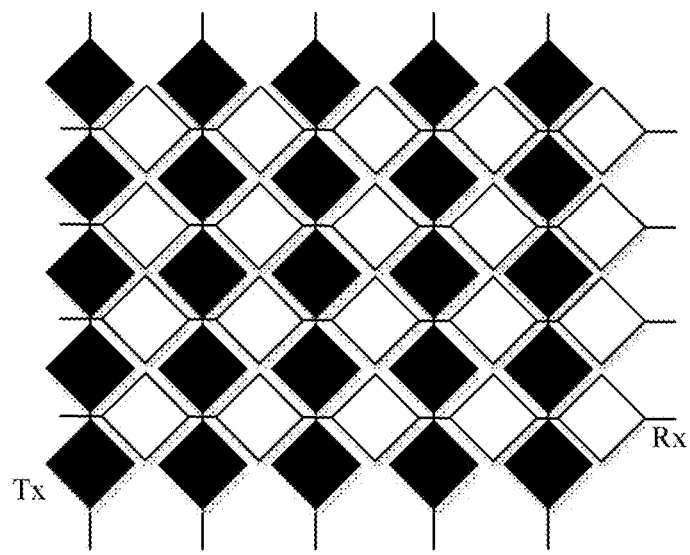
FIG. 1A is a schematic view of a touch electrode arrangement.

In order to make the objectives, technical solutions and advantages of the embodiments of the present disclosure more comprehensible, the technical solutions of the embodiments of the present disclosure are clearly and completely described below with reference to the accompanying drawings. Obviously, the described embodiments are only a part but not all of the embodiments of the present disclosure. Based on the described embodiments of the present disclosure, all other embodiments obtained by those skilled in the art without creative efforts shall also fall within the protection scope of the present disclosure.

As used herein and in the appended claims, the singular form of a word includes the plural, and vice versa, unless the context clearly dictates otherwise. Thus, the references "a", "an", and "the" are generally inclusive of the plurals of the respective terms. Similarly, the words "comprise", "comprises", and "comprising" are to be interpreted inclusively rather than exclusively.

For purposes of the description, hereinafter, the terms "upper", "lower", "right", "left", "vertical", "horizontal", "top", "bottom", and derivatives thereof shall relate to the disclosure, as it is oriented in the drawing figures. The terms "overlying", "atop", "positioned on" or "positioned atop" means that a first element, such as a first structure, is present on a second element, such as a second structure, wherein intervening elements, such as an interface structure, e.g. interface layer, may be present between the first element and the second element. The term "contact" means that a first element, such as a first structure, and a second element, such as a second structure, are connected with or without any intermediary elements at the interface of the two elements.

For the mutual capacitive touch technology, there is a certain capacitance between the touch electrodes in the touch layer (for example, a transmitting electrode Tx and a receiving electrode Rx). When touched by a finger, a capacitance change occurs between the touch electrodes. The touch positioning could be realized according to the capacitance change. This capacitance change can be detected, for example, by a control device such as a control integrated circuit. In addition, when touched by a finger, the capacitance change ΔCm between the touch electrodes and the coupling capacitance Cm between the touch electrodes directly determine the magnitude of the touch signal. Thus, the capacitance change and the coupling capacitance can be used to evaluate the touch effect. The touch signal MR satisfies the following formula:

$$MR = \frac{\Delta Cm}{Cm} = \frac{Cno\_touch - Ctouch}{Cno\_touch}. \quad (1)$$

Wherein, Cm represents the coupling capacitance between the transmitting electrode Tx and the receiving electrode Rx, ΔCm represents the change in the coupling capacitance between the transmitting electrode Tx and the receiving electrode Rx, Cno_touch represents the coupling capacitance between the transmitting electrode Tx and the receiving electrode Rx in the absence of touch, Ctouch represents the coupling capacitance between the transmitting electrode Tx and the receiving electrode Rx in the presence of a touch.

It can be seen from the above formula that reducing the coupling capacitance between the touch electrodes can improve the touch signal, thereby improving the touch performance.

FIG. 1A is touch electrode arrangement for mutual capacitive touch in a related art. In this arrangement, the transmitting electrodes Tx and the receiving electrodes Rx are rhombus-shaped and alternately arranged in the row direction. However, for this arrangement, the coupling capacitance between the touch electrodes is large. From the above formula (1), it can be seen that a larger coupling capacitance will lead to a smaller touch signal, which makes the touch positioning vulnerable to the influence of a non-ideal touch surface (e.g., with stains). For example, a touch ghost (Gost) or line jitter is generated, which seriously affects the user experience. In addition, the coupling capacitance between the touch electrodes shall not be too small, because too small coupling capacitance will result in the inability to detect the touch signal effectively. Therefore, for mutual capacitive touch, it is necessary to finely control the coupling capacitance between the touch electrodes within a desired range.

Figure 1B:
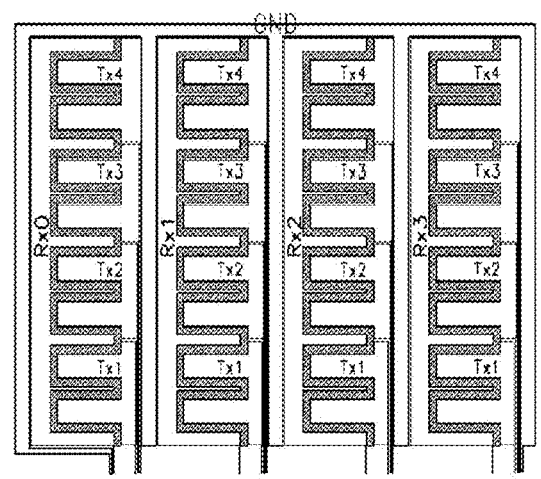
FIG. 1B is a schematic view of another arrangement of touch electrodes.

FIG. 1B is a schematic view of another arrangement of touch electrodes. Unlike the structure of FIG. 1A, in the arrangement of FIG. 1B, the transmitting electrodes Tx1-Tx4 and the receiving electrodes Rx0-Rx3 have a tooth-like structure. For the structure of FIG. 1B, the coupling capacitance between the touch electrodes is still relatively large, and the touch signal is relatively weak.

Figure 2:
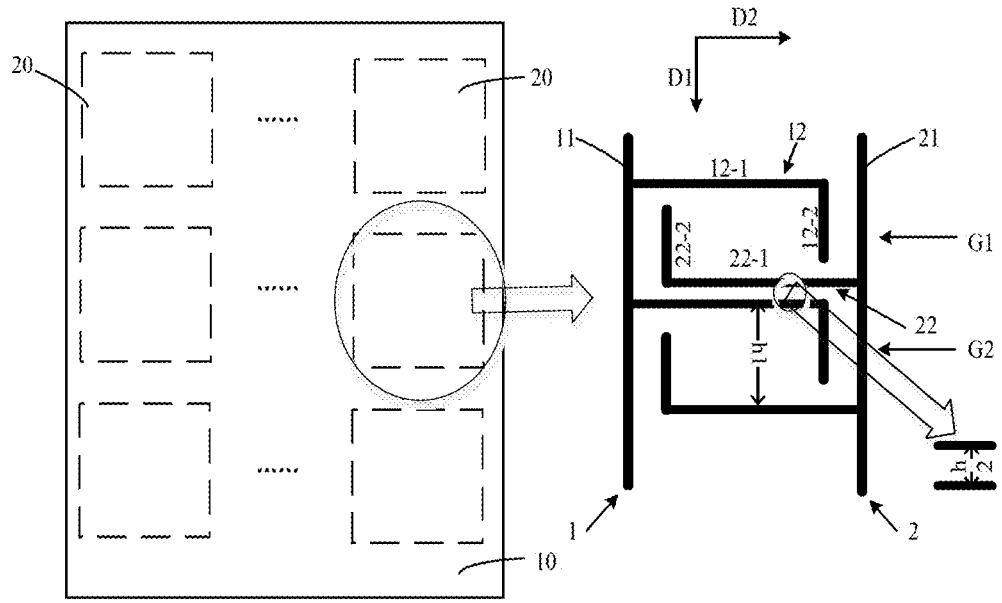
FIG. 2 is a schematic view of a touch substrate according to an embodiment of the present invention.

FIG. 2 is a schematic view of a touch substrate according to an embodiment of the present invention. As shown in FIG. 2, a touch substrate according to an embodiment of the present invention includes a substrate 10 and at least one touch control unit 20 located on the substrate 10. The touch control unit 20 includes a first touch electrode 1 and a second touch electrode 2. The first touch electrode 1 has a first bus bar 11 extending along the first direction D1 and a first inner electrode 12 extending from the first bus bar 11. The second touch electrodes 2 have second bus bar 21 extending along the first direction D1 and a second inner electrode 22 extending from the second bus bar 21. The first bus bar 11 and the second bus bar 21 are disposed opposite to each other. The first inner electrode 12 and the second inner electrode 22 are located between the first bus bar 11 and the second bus bar 21. The first inner electrode 12 and the second inner electrode 22 are alternately spaced from each other along the first direction D1. Herein, an expression that an object A extends from an object B means that the object A is a branch of the object B.

As shown in FIG. 2, a pair of adjacent first inner electrode 12 and second inner electrode 22 constitute an inner electrode group (e.g., G1, G2 in FIG. 2). Within each inner electrode group, at least a portion of the first inner electrode 12 extends toward the second inner electrode 22, and at least a portion of the second inner electrode 22 extends toward the first inner electrode 12. Here, an expression that an object A extends toward an object B means that the extension direction of the object A intersects with the object B. "Extension direction" refers to a direction that defines the maximum dimension (e.g., length) of an object.

The arrangement of the touch electrodes according to the embodiments of the present invention can reduce the area of the first touch electrode and/or the area of the second touch electrode, and the overlapping area between the first touch electrode and the second touch electrode can also be reduced. Therefore, the coupling capacitance between the two can be reduced, the coupling capacitance can be kept within a reasonable value, the optimization of the coupling capacitance between the first touch electrode and the second touch electrode can be realized, touch ghost points can be eliminated, touch precision can be improved, and touch threshold range can be increased.

Furthermore, for a touch substrate such as FIG. 1, since the distance between the finger and the touch electrode is very close (for example, only one layer of polarizer with a thickness of about 140 μm), the coupling capacitance value of the corresponding touch control unit changes largely when the finger touches the touch substrate, while the change of the coupling capacitance value of the touch control units around the corresponding touch control unit is small, the accuracy of the obtained touch coordinates thus will be affected. In an embodiment of the present invention, the coupling capacitance between the first touch electrode and the second touch electrode of the touch substrate is reduced, which reduces the change in the coupling capacitance of the touch control unit corresponding to the touch of the touch substrate with a finger and the difference in the change value of the coupling capacitance of the surrounding touch control units, accurate touch coordinate calculation and positioning can be realized.

In addition, such an arrangement can increase the area of the region enclosed by the first touch electrodes and the second touch electrodes and can reduce the number of wires connecting the touch control unit to the peripheral circuit. In other words, the number of pins in the bonding area can be reduced, and the margin of the MDL bonding process can be improved. It can also effectively reduce the fluctuation of the ADC value and improve the yield.

As shown in FIG. 2, the touch control unit 20 may further include at least two inner electrode groups (e.g., G1-G2 in FIG. 2) arranged at intervals. Electrodes are not shared between adjacent inner electrode groups. The first touch electrodes may be the transmitting electrodes Rx, and the second touch electrodes may be the receiving electrodes Tx.

As shown in FIG. 2, in some embodiments, for each inner electrode group, the first inner electrode 12 includes a first portion 12-1 connected to the first bus bar 11 and extending toward the second bus bar 21, and a second portion 12-2 extending toward the second inner electrode 22. The second inner electrode 22 may include a first portion 22-1 connected to the second bus bar 21 and extending toward the first bus bar 11 and a second portion 22-2 extending toward the first inner electrode 12.

The shortest distance h1 from the first portion 12-1 of the first inner electrode to the first portion 22-1 of the second inner electrode in the same inner electrode group is greater than the shortest distance h2 between adjacent inner electrode groups. Here, "the shortest distance from the first portion 12-1 of the first inner electrode to the first portion 22-1 of the second inner electrode in the same inner electrode group" refers to the minimum value of the distance from any point on the first portion 12-1 of the first inner electrode to any point on the first portion 22-1 of the second inner electrode in the same inner electrode group. "The shortest distance between adjacent inner electrode groups" refers to the minimum value of the distance from any point in an inner electrode group to any point in its adjacent inner electrode group. In this way, the h2 between adjacent inner electrode groups is set relatively small, which can prevent the touch signal from being too small due to the coupling capacitance between the first electrode and the second electrode being too small.

The first portion 12-1 of the first inner electrode 12 and the first portion 22-1 of the second electrode 22 may extend along the second direction D2. The second portion 12-2 of the first inner electrode 12 and the second portion 22-2 of the second inner electrode 22 may extend along the first direction D1. The first portion 12-1 and the second portion 12-2 of the first inner electrode 12 and the first portion 22-1 and the second portion 22-2 of the second inner electrode 22 can form a "small rectangle in a bigger rectangle" shape structure. With such a structure, an optimized mutual capacitance can be realized. The touch signal is improved, and jitter is reduced.

The touch substrate may include a touch control unit array composed of a plurality of touch control units 20. For the touch control units 20 in one column of the touch control unit array, the first bus bars 11 of the first inner electrodes 1 of each touch control unit may be the same line, and the line may be connected to a peripheral circuit to receive signals. The second bus bars 12 of the second inner electrodes 2 of each touch control unit of the touch control unit array can be respectively connected to peripheral circuits to transmit signals.

Figure 3:
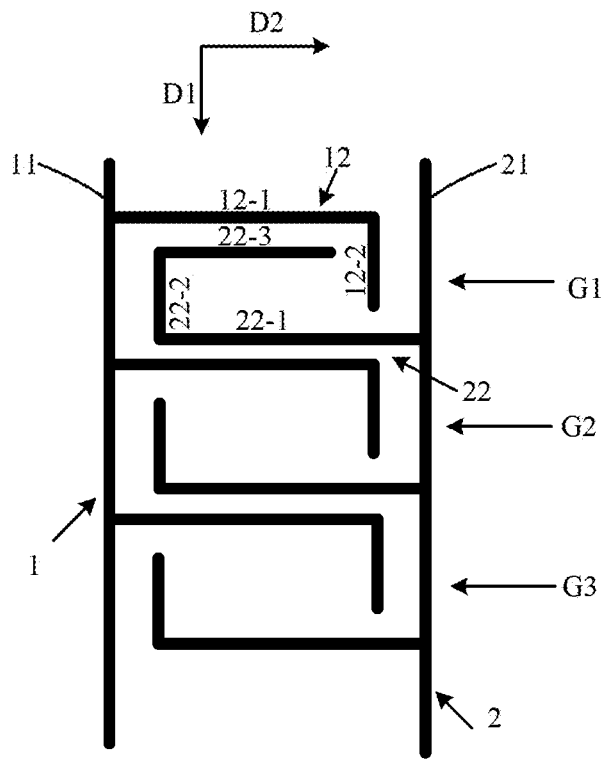
FIG. 3 is a schematic view of a touch control unit of a touch control substrate according to an embodiment of the present invention.

FIG. 3 is a schematic view of a touch control unit of a touch substrate according to an embodiment of the present invention. As shown in FIG. 3, the second inner electrode 22 of the at least one inner electrode group may further include a third portion 22-3 extending toward the second portion 12-2 of the first inner electrode 12. The third portion 22-3 of the second inner electrode 22 is located between the first portion 12-1 of the first inner electrode 12 and the first portion 22-1 of the second inner electrode 22. The third portion 22-3 of the second inner electrode 22 is used to increase the coupling capacitance between the first touch electrode and the second touch electrode, when necessary, to avoid the phenomenon that the touch signal is difficult to be detected due to the coupling capacitance being too low.

As shown in FIG. 3, in some embodiments, the inner electrode group including the third portion 22-3 of the second inner electrode may be located at the outermost side of the touch control unit along the first direction D1, and the third portion 22-3 of the second inner electrode 22 may extend along the second direction D2.

FIG. 3 shows that the touch control unit includes three pairs of inner electrode groups as an example. The number of the inner electrode groups can be adjusted according to actual needs, for example, according to the size of the touch substrate. For example, the number of inner electrode groups in one touch control unit can be set to 2-6.

Figure 4:
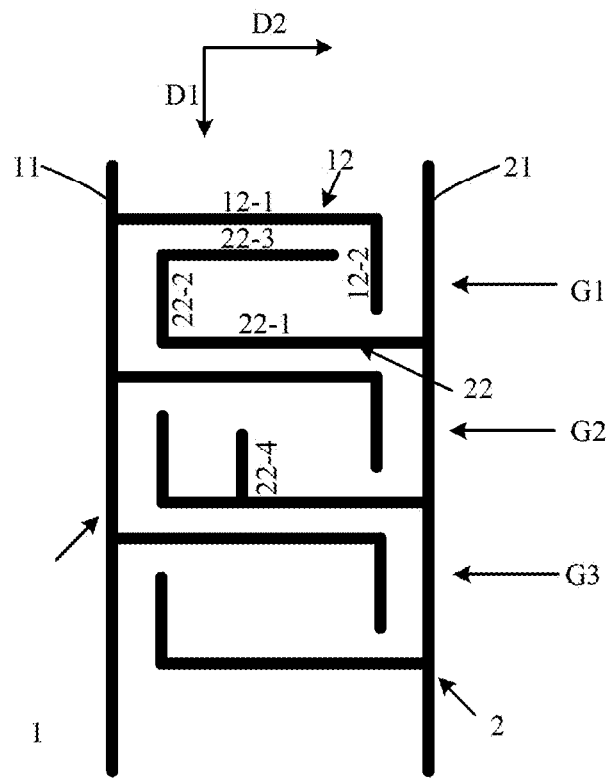
FIG. 4 is a partial schematic view of a touch substrate according to an embodiment of the present invention.

FIG. 4 is a partial schematic view of a touch substrate according to an embodiment of the present invention. As shown in FIG. 4, the second inner electrode 22 of the at least one inner electrode group may further include a fourth portion 22-4 extending from the first portion 22-1 of the second inner electrode 22 toward the first portion 12-1 of the first inner electrode 12. The fourth portion 22-4 of the second inner electrode 22 is located between the second portion 22-2 of the second inner electrode 22 and the second portion 12-2 of the first inner electrode 12. The fourth portion 22-4 of the second inner electrode 22 may also extend along the opposite direction of the first direction D1, and its width may be between about 150 µm~400 µm. The width of the fourth portion 22-4 of the second inner electrode 22 can also be set according to the magnitude of the touch signal.

The fourth portion 22-4 of the second inner electrode 22 can prevent the touch signal from being too weak due to the too small coupling capacitance between the first touch electrode and the second touch electrode, thereby optimizing the touch effect. Especially when the coupling capacitance between the first touch electrode and the second touch electrode and the distance between the second portion 12-2 of the first inner electrode and the second portion 22-2 of the second inner electrode is long, disposing the fourth portion 22-4 of the second inner electrode can improve the touch performance.

Figure 5:
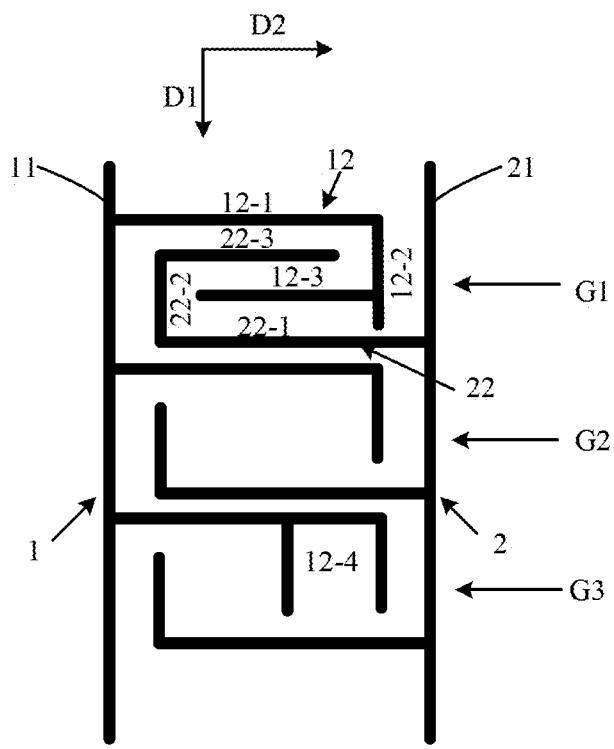
FIG. 5 is a partial schematic view of a touch substrate according to an embodiment of the present invention.

FIG. 5 is a partial schematic view of a touch substrate according to an embodiment of the present invention. As shown in FIG. 5, the first inner electrode 12 further includes a third portion 22-3 extending from the second portion 12-1 of the first inner electrode 12 toward the second portion 22-2 of the second inner electrode 22. The third portion 12-3 of the first electrode 12 is located between the first portion 22-1 of the second inner electrode 22 and the third portion 22-3 of the second inner electrode 22. The third portion 12-3 of the first inner electrode may extend along the second direction D2, and the width thereof may be between about 100 µm~200 µm. It should be understood that, in the present invention, the width refers to the dimension of the object perpendicular to the length direction. The width of the third portion 12-3 of the first inner electrode 22 can also be set according to the magnitude of the touch signal.

The third portion 12-3 of the first electrode 12 can prevent the touch signal from being too weak due to the too small capacitance between the first touch electrode and the second touch electrode, thereby improving the touch effect. Especially when the coupling capacitance between the first touch electrode and the second touch electrode is small and the distance between the first portion 12-1 of the first inner electrode and the first portion 22-1 of the second inner electrode is long, setting the third portion 22-3 of the first inner electrode can improve the touch performance.

The first inner electrode may also include a fourth portion 12-4 extending from the first portion 12-1 of the first inner electrode 12 toward the first portion 22-1 of the second inner electrode 22. The fourth portion 12-4 of the first inner electrode is located between the second portion 12-2 of the first inner electrode and the second portion 22-2 of the second inner electrode. The fourth portion of the first inner electrode may extend along the first direction D1. The fourth portion 12-4 of the first electrode 12 can prevent the touch signal from being too weak due to the too small capacitance between the first touch electrode and the second touch electrode, thereby improving the touch effect. In particular, the coupling capacitance between the first touch electrode and the second touch electrode is relatively small, and the distance between the second portion 12-2 of the first inner electrode and the second portion 22-2 of the second inner electrode is relatively long, the third portion 22-34 of the first inner electrode can improve the touch performance.

The first electrode may be the receiving electrode Rx. The width of the first bus bar 11 may be between about 200 µm~400 µm. The width of the first portion 12-1 of the first inner electrode may be between about 150 µm~350 µm. The width of the second portion 12-2 of the first inner electrode may be between about 120 µm~300 µm. Setting the receiving electrodes with the above-mentioned width values can better meet the requirements of receiving signals.

The second electrode may be the transmitting electrode Tx. The width of the second bus bar 21 may be between about 200 µm~350 µm. The width of the first portion 22-1 of the second inner electrode may be between about 150 µm~400 µm. The width of the second portion 22-2 of the second inner electrode may be between about 120 µm~300 µm. The width of the third portion 22-3 of the second inner electrode may be between about 150 µm~400 µm. Setting the transmitting electrodes with the above width values can better meet the requirements of transmitting signals.

Figure 6:
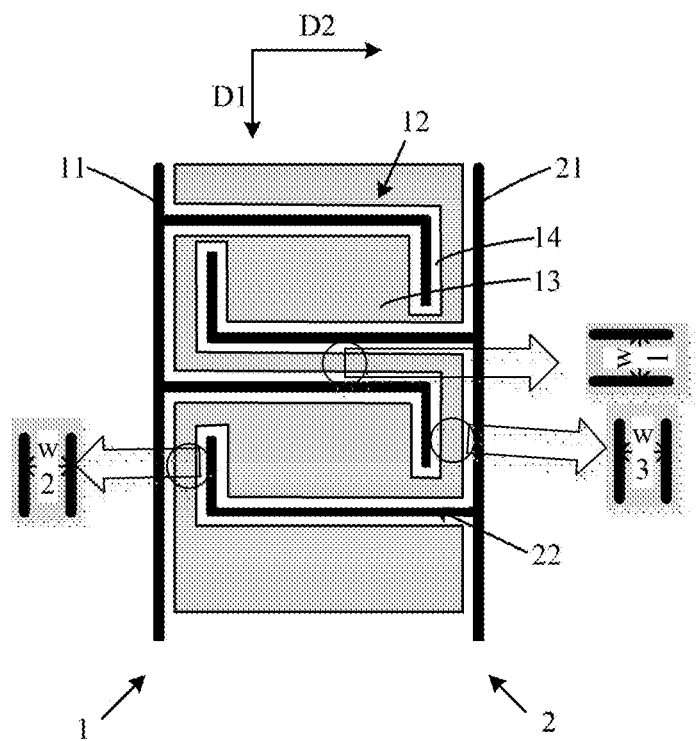
FIG. 6 is a partial schematic view of a touch substrate according to an embodiment of the present invention.

FIG. 6 is a partial schematic view of a touch substrate according to an embodiment of the present invention. As shown in FIG. 6, the touch substrate according to an embodiment of the present invention may further include a dummy conductive portion 13 disposed between the first inner electrode 12 and the second inner electrode 22. gaps 14 is provided between the dummy conductive portion 13 and the first inner electrodes 12 and between the dummy conductive portion 13 and the second inner electrode 22 to space the dummy conductive portion 13 from the first and second inner electrodes 12 and 22. According to an embodiment of the present invention, the dummy conductive portion 14 may be suspended, maintaining electrical isolation from other components.

In order to avoid the generation of Moire pattern, a wide hollow gap cannot be arranged between the first touch electrode and the second touch electrode, resulting in a small equivalent distance between the two. The arrangement of the dummy conductive portion can increase the equivalent distance between the first touch electrode and the second touch electrode without changing the hollow gap, thereby reducing the coupling capacitance between the first touch electrode and the second touch electrode and increasing the MR value of the touch signal. The width w1 of the dummy conductive portion between two adjacent inner electrode groups may range from 100 µm to 200 µm. The width w2 of the dummy conductive portion between the first bus bar and the second portion of the second inner electrode in the same inner electrode group may range from 100 µm to 200 µm. The width w3 of the dummy conductive portion between the second bus bar and the second portion of the first inner electrode in the same inner electrode group may range from 100 µm to 200 µm.

The dummy conductive portion may be formed in the same layer as the first inner electrode and the second inner electrode. For example, a conductive layer may be formed on the substrate and then patterned to form the first inner electrode, the second inner electrode and the dummy conductive portion. In this way, although the dummy conductive portion is provided, no new process is added, the manufacturing process is not more complicated, and the manufacturing cost is not higher.

By adjusting the ratio of the area of the dummy conductive portion to the area of the touch control unit, the touch signal MR value can be adjusted. Table 1 shows the MR values under different proportions of dummy conductive portions. The "proportion of the dummy conductive portion" here refers to the ratio of the projected area of the dummy conductive portion on the substrate to the projected area of the touch control unit on the substrate.

TABLE 1

| Proportion of dummy conductive portions | MR value | | | | | |
|---|---|---|---|---|---|---|
| | test point 1 | test point 2 | test point 3 | test point 4 | test point 5 | average |
| Comparative example | 11.0% | 10.6% | 8.3% | 8.9% | 12.1% | 10.2% |
| 5% | 14.2% | 14.4% | 14.5% | 14.8% | 15.8% | 14.8% |
| 10% | 16.9% | 17.4% | 17.3% | 17.1% | 17.9% | 17.3% |
| 20% | 16.9% | 16.8% | 19.1% | 19.4% | 20.4% | 18.5% |
| 60% | 16.6% | 17.4% | 20.1% | 20.0% | 19.8% | 18.8% |

The comparative example is the touch substrate shown in FIG. 1B. It can be seen from Table 1 that, compared with the MR value of the comparative example, the ratio of the MR value of the example of the present invention with a proportion of the dummy conductive portion of 60% is improved by more than 80%. The data in Table 1 also proves that the embodiments of the present invention can effectively increase the MR value of the touch signal and significantly improve the touch effect. Since the touch threshold is usually determined according to the touch signal, the embodiments of the present invention can also increase the range of the touch threshold.

Figure 7:
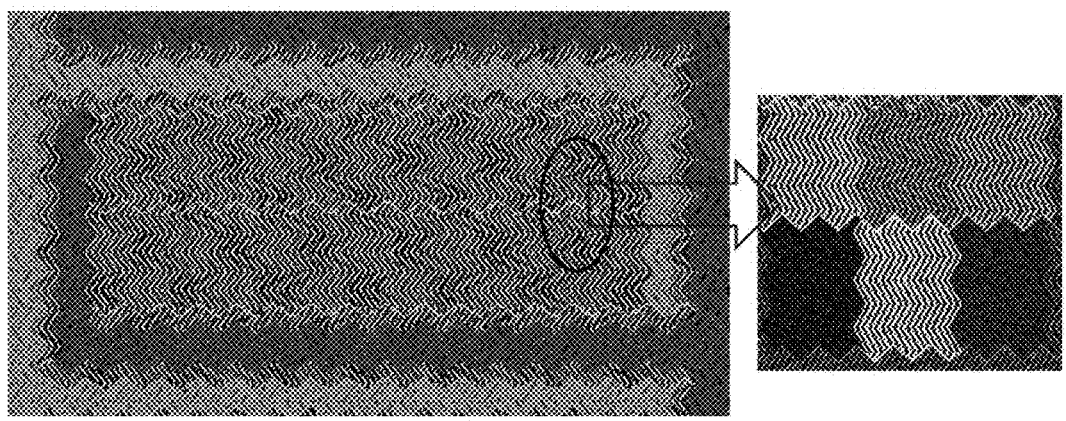
FIG. 7 is a schematic view of a touch substrate according to an embodiment of the present invention.

FIG. 7 is a schematic view of a touch substrate according to an embodiment of the present invention. As shown in FIG. 7, the dummy conductive portion 14, the first touch electrodes 12 and the second touch electrodes 22 may be hollowed out. The white part in FIG. 7 represents the hollow part. The hollow pattern arranged in this way can prevent the dummy conductive portion, the first touch electrode and the second touch electrode from blocking light. In addition, the hollowed-out dummy conductive portion can also prevent the influence of static electricity.

Figure 8:
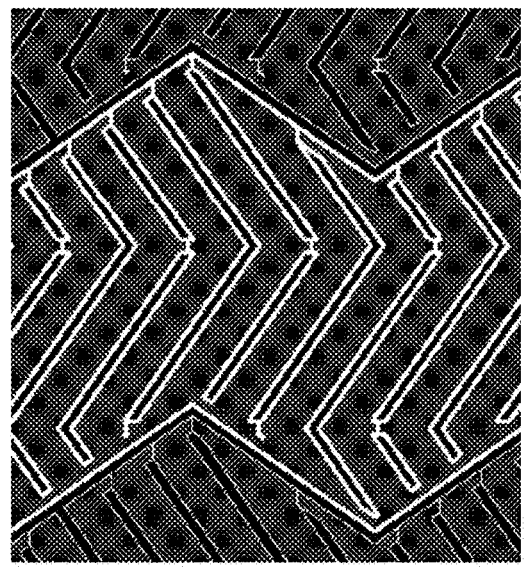
FIG. 8 is a partial enlarged view of FIG. 7.

FIG. 8 is a partial enlarged view of FIG. 7. The hollowed-out shape can be seen more clearly from FIG. 8. In addition, the pattern of the touch control unit with the hollow shape is different from the pattern of the R/G/B sub-pixels disposed under the touch control unit, which can also prevent undesired Moire pattern.

The inventors also tested the ADC (analog-to-digital conversion) value test of the touch device of some embodiments. Qualified ADC values are set to be between 900 and 3800. The fluctuations of the ADC value measured under short-circuit and open-circuit conditions are relatively small, and the range measured by the inventor is between 931 and 3600. These ADC values are all qualified. Therefore, it can be seen that the touch device according to the embodiments of the present invention can reduce the fluctuation of the ADC value, increase the touch threshold range, and improve the product yield.

Figure 9:
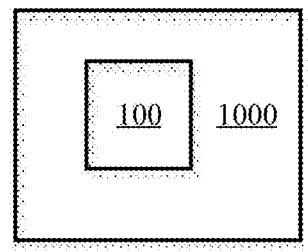
FIG. 9 is a schematic view of a touch device according to an embodiment of the present invention.

FIG. 9 is a schematic view of a touch device according to an embodiment of the present invention. The touch device 1000 shown in FIG. 10 may include any touch substrate 100 shown in FIGS. 2 to 8.

The specific embodiments have been described, and are not intended to limit the scope of the disclosure. In fact, the novel embodiments described herein can be implemented in a variety of other forms. In addition, various omissions, substitutions, and changes in the form of the embodiments described herein may be made without departing from the spirit of the disclosure. The following claims and their equivalents are intended to cover such forms or modifications that fall within the scope and spirit of the disclosure.

What is claimed is:

1. A touch substrate, comprising:
a substrate; and
at least one touch control unit on the substrate,
wherein the touch control unit comprises:
a first touch electrode and a second touch electrode,
wherein the first touch electrodes have a first bus bar extending along a first direction and a first inner electrode extending from the first bus bar,
wherein the second touch electrode has a second bus bar extending along the first direction and a second inner electrode extending from the second bus bar,
wherein the first bus bar and the second bus bar are opposite to each other, wherein the first inner electrode and the second inner electrode are between the first bus bar and the second bus bar, and wherein the first inner electrode and the second inner electrode are alternately spaced from each other in the first direction,
wherein each pair of adjacent first inner electrode and second inner electrode constitutes an inner electrode group, and the touch control unit comprises at least two inner electrode groups,
wherein, within each inner electrode group, at least a portion of the first inner electrode extends toward the second inner electrode, and at least a portion of the second inner electrode extends toward the first inner electrode,
the first inner electrode comprises a first portion, a second portion and a third portion, the first portion of the first inner electrode connected to the first bus bar and extending toward the second bus bar, the second portion of the first inner electrode extending toward the second inner electrode, and the third portion of the first inner electrode extending from the second portion of the first inner electrode,
the second inner electrode comprises a first portion, a second portion and a third portion, the first portion of the second inner electrode connected to the second bus bar and extending toward the first bus bar, the second portion of the second inner electrode extending toward the first inner electrode and the third portion of the second inner electrode extending toward the second portion of the first inner electrode,
wherein the third portion of the second inner electrode is between the first portion of the first inner electrode and the first portion of the second inner electrode, and wherein an extension direction of the third portion of the second inner electrode is perpendicular to both of an extension direction of the first bus bar and an extension of the second bus bar, and wherein the third portion of the first inner electrode is between the first portion of the second inner electrode and the third portion of the second inner electrode and extends toward the second portion of the second inner electrode, a projection of the second portion of the second inner electrode in the first direction extends beyond a projection of the third portion of the second inner electrode in the first direction;

a dummy conductive portion disposed between the first inner electrode and the second inner electrode, and gaps between the dummy conductive portion and the first inner electrode and between the dummy conductive portion and the second inner electrode, wherein a width w1 of the dummy conductive portion between two adjacent inner electrode groups ranges from 100 μm to 200 μm, wherein a width w2 of the dummy conductive portion between the first bus bar and the second portion of the second inner electrode in a same inner electrode group ranges from 100 μm to 200 μm, and wherein a width w3 of the dummy conductive portion between the second bus bar and the second portion of the first inner electrode in a same inner electrode group ranges from 100 μm to 200 μm.

2. The touch substrate according to claim 1, wherein a shortest distance from the first portion of the first inner electrode to the first portion of the second inner electrode in a same inner electrode group is greater than a shortest distance between adjacent inner electrode groups.

3. The touch substrate according to claim 2, wherein the first portion of the first inner electrode and the first portion of the second electrode extend along a second direction perpendicular to the first direction, the second portion of the first inner electrode and the second portion of the second inner electrode extend along the first direction.

4. The touch substrate according to claim 1, wherein a second inner electrode of one inner electrode group in the touch control unit further comprises the third portion, and wherein the one inner electrode group is at the outermost side of the touch control unit along the first direction.

5. The touch substrate according to claim 1, wherein a second inner electrode of at least one inner electrode group in the touch control unit further comprises a fourth portion extending from the first portion of the second inner electrode toward the first portion of the first inner electrode, wherein the fourth portion of the second inner electrode is between the second portion of the second inner electrode and the second portion of the first inner electrode.

6. The touch substrate according to claim 5, wherein the fourth portion of the second inner electrode extends along a direction opposite to the first direction.

7. The touch substrate according to claim 1, wherein the third portion of the first inner electrode extends along a direction opposite to the second direction.

8. The touch substrate according to claim 1, wherein the first inner electrode of the at least one inner electrode group of the touch control unit further comprises a fourth portion extending from the first portion of the first inner electrode toward the first portion of the second inner electrode, wherein the fourth portion of the first inner electrode is between the second portion of the first inner electrode and the second portion of the second inner electrode.

9. The touch substrate according to claim 8, wherein the fourth portion of the first inner electrode extends along the first direction.

10. The touch substrate according to claim 1, wherein the dummy conductive portion, the first touch electrode and the second touch electrode are hollowed out.

11. The touch substrate according to claim 1, wherein the first touch electrode comprises a receiving electrode, wherein a range of a width of the first bus bar is 200 μm~400 μm, wherein a range of a width of the first portion of the first inner electrode is 150 μm~350 μm, a range of a width of the second portion of the first inner electrode is 120 μm~300 μm, and a range of a width of the third portion of the first inner electrode is 100 μm~200 μm.

12. The touch substrate according to claim 1, wherein the second touch electrode comprises a transmitting electrode, a range of a width of the second bus bar is 200 μm~350 μm, a range of a width of the first portion of the second inner electrode is 150 μm~400 μm, a range of a width of the second portion of the second inner electrode is 120 μm~300 μm, a range of a width of the third portion of the second inner electrode is 150 μm~400 μm, and a range of a width of the fourth portion of the second inner electrode is 150 μm~400 μm.

13. A touch device, comprising the touch substrate according to claim 1.

14. The touch device according to claim 13, wherein the touch control unit comprises at least two inner electrode groups.

* * * * *